Patented Feb. 15, 1927.

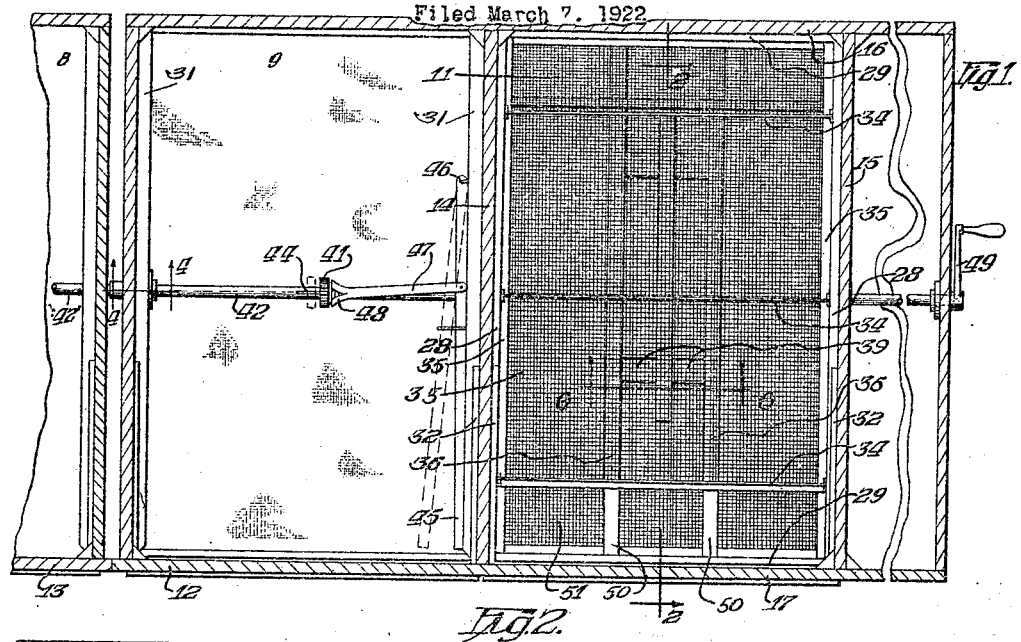

1,618,005

UNITED STATES PATENT OFFICE.

FRANKLIN C. HARE, OF ROCKFORD, ILLINOIS, ASSIGNOR TO J. W. MILLER CO., OF ROCKFORD, ILLINOIS, A CORPORATION OF ILLINOIS.

INCUBATOR.

Application filed March 7, 1922. Serial No. 541,787.

This invention pertains in general to incubators, and has more particular reference to egg-turning devices and related subject matter.

The primary object is to provide an egg-turning means of novel construction adapted for embodiment in any incubator, but particularly desirable for use in mammoth incubators, in which it is necessary to turn the eggs in many compartments two or three times every twenty-four hours. I have aimed, therefore, to provide a means whereby all the eggs in the many compartments may be turned very easily and conveniently in a comparatively short time and with assurance that the eggs will be uniformly turned without breakage.

Another object resides in the provision of an egg-turning means so embodied in a tray as not to lessen the carrying capacity thereof.

Another object is to provide in an incubator, an egg-turning device so associated with an egg tray that the latter may be moved horizontally into and out of the egg chamber, or in other words, may be slid as a drawer into and out of operative position and may be safely supported on its guideways in extended position for inspection of the eggs.

Still another object is to provide an egg tray and turning device including a removable end-gate in the tray to allow the chicks to drop into the nursery tray below.

I have also aimed to design an egg tray and turning device constructed in such simple manner that it may be produced at a comparatively low cost and will serve very efficiently and practically the purposes intended.

In furtherance of some of these objects, my invention contemplates, generally stated, the provision of an egg tray having a foraminous sectional bottom, one of the sections of which is movable with respect to and overlaps another section. Stationary egg baffles extend across the bottom, and by provision of means for moving said movable bottom section back and forth, the eggs disposed on this and the overlapping section will be turned in a very effectual manner without crushing. Many practical and desirable advantages may be attributed to the use of an egg tray and turning device embodying this principle of operation as will be more fully described hereinafter.

Other objects and attendant advantages will be appreciated by those skilled in this art as the invention becomes better understood by reference to the following description when considered in connection with the accompanying drawings, in which—

Figure 1 is a plan section through several contiguous egg compartments from one of which the egg tray has been removed, illustrating the principles of my invention;

Fig. 2, a vertical section through one of the egg compartments taken substantially on the line 2—2 of Fig. 1;

Fig. 3, a vertical sectional view longitudinally through the egg tray and turning device illustrating the method of turning the eggs;

Fig. 4, a detail section taken on the line 4—4 of Fig. 1;

Fig. 5, a section taken on the line 5—5 of Fig. 4; and

Fig. 6, a detail section taken on the line 6—6 of Fig. 1.

While the present invention is applicable to any incubator, nevertheless, it is as suggested above, particularly desirable in connection with mammoth incubators. In the present case, I have shown my invention in connection with one end of a mammoth incubator including three egg compartments, 8, 9 and 11, disposed side by side. In practice, it is customary to form two egg compartments in one unit and to join these units together in any desired combination. Fig. 1 shows one complete double compartment unit designated generally by 12 and the adjoining end of another such unit 13. Inasmuch as the construction of each egg compartment and the parts therein is identical, a description of one will suffice.

Referring, therefore, to the egg compartment 11, it will be seen that this is formed by upright side walls 14 and 15, joined by a rear wall 16 and a front wall 17, the latter of which has a doorway 18 adapted to be closed by a suitable door 19 having the usual window 21. A top 22 covers the egg compartment which has the usual thermostatically controlled damper opening 23. Heater pipes 24 extend through the top portion of the egg compartment and may be controlled in any suitable manner for maintaining a uniform heat. The moisture pan 25 and the nursery tray 26 in the bottom of the incubator may be of any suitable or preferred construction. With the exception of the moisture pan, the construction described so far is conventional.

My invention contemplates the provision of a novel egg-turning device, which is preferably but not necessarily, embodied in connection with a removable egg tray, designated generally by 27. The tray shown comprises sides 28 joined by ends 29. This rectangular frame is slidable in drawer fashion through the doorway 18 on cleats or guides 31 fixed to the sides 14 and 15 and extending preferably throughout the length thereof. A top cleat 32 on each side wall of the compartment serves to support the egg tray when the latter is substantially withdrawn through the doorway for purpose of inspecting the eggs. This feature is very desirable as it is not necessary for the attendant to hold the outer end of the tray. Instead, the tray will be safely and substantially supported by the top and bottom cleats or guides 31 and 32 and the attendant has free use of his hands for inspection of the eggs or attending to any other requirements.

I have provided means for supporting and turning the eggs in the tray, which will not restrict the egg capacity, or give cause to breakage by reason of the turning operation. Such means, as will be presently apparent, insures that every egg will be sufficiently turned; and furthermore, the principle of operation is such that the egg turning operation may be performed very easily and conveniently and with little effort, either for a single compartment or when simultaneously operating the turning devices in a large number of compartments. To this end, my invention contemplates a foraminous bottom which carries the eggs and is movable back and forth, and egg baffles positioned above the bottom in proximity thereto dividing the egg-supporting area into defined areas. The eggs in each area will by movement of the bottom in one direction and by reason of contact one with the other and with the baffles, be turned or rolled a variable amount. In other words, the eggs resting on the tray bottom, will be moved merely by frictional contact with said moving bottom and by interposition of said baffles, the movement of the eggs will be rotative about substantially fixed axes as distinguished from lineal rolling. By dividing the egg space into limited areas by means of said baffles, the side thrust or frictional contact of one egg against another is reduced to a minimum with the result that the eggs will be more uniformly moved and the egg pressure or thrust will be reduced, thus minimizing the possibility of breakage. While I have in the present embodiment shown the egg space divided into four such areas, a greater number of baffles may obviously be used, thereby further reducing the lateral egg pressure and separating the eggs into more restricted areas so that the greatest number of eggs have contact only with the movable bottom and the baffles. In the present embodiment of my invention, the movable bottom 33 is mounted in connection with the egg tray to move back and forth lengthwise thereof, beneath a series of baffle plates 34, which extend crosswise of the tray in spaced relation and are secured at their ends to the sides 28. In this example, the bottom 33 is of wire mesh, known in the trade as hardware cloth, and the marginal edges are bound by sheet metal strips 35. Said bottom may be supported in any suitable manner on the tray, and in this case, a pair of supporting bars 36 are provided for this purpose extending longitudinally of the tray in laterally spaced relation and having metal wear strips 30 on which the bottom slides. Said bottom may be moved back and forth by any suitable means, for example, a pinion and rack. The rack 37 is connected to the bottom 33 through the agency of a wood cleat 38 which serves also as a reinforcement therefor. This cleat carries a pair of laterally extending spaced arms 39, which bear against the underside of the supporting bars 36 and prevent upward displacement of the bottom under the influence of the spur pinion 41, which meshes with the rack 37. The pinion, axially slidable on a shaft 42, which passes through the side walls 14 and 15 of the egg compartment, carries a diametrically disposed pin 43 which passes through a slot 44 in the shaft, thus establishing a driving connection therewith.

Suitable means is employed for moving the pinion 41 into and out of engagement with the rack 37, comprising in the present instance, a lever 45 pivoted at 46 to one of the side walls of the compartment and extending forwardly into convenient reach through the doorway 18, and a link 47 pivotally connected to the lever and having a forked end 48 disposed in the groove in the hub of the opening. It will be manifest that by shifting the lever 45 laterally, the pinion 41 may be moved into and out of mesh with the rack 37, and in this way the egg-turning device may be put into and out of operative condition. When the pinion is disconnected from the movable bottom, the egg tray may be freely withdrawn from and returned to the operative position in the egg compartment. The shaft 42 may be oscillated by any suitable means, such as a hand crank 49 at one end of the compartment.

From the foregoing, it will be manifest that means is provided for moving the bottom 33 of the egg tray back and forth for the purpose of turning the eggs supported thereon, as described. By extending the shaft 42 through a plurality of egg compartments and equipping each compartment with an egg-turning device such as described, a common means is thus established, operable from one end of the incubator as by means of a crank 49 or from any suitable source of power for simultaneously turning the eggs in all of the compartments thus related. If conditions require, the egg-turning device in any compartment may be disconnected from the common operating means by shifting the lever 45 to disconnect its respective pinion and rack.

My invention now contemplates embodying in an egg-turning device of the character described one or more end-gates constituting part of the tray bottom and removable to permit the chicks to drop through to the nursery tray. These end-gates 51 and 52 supported at the front and rear ends respectively of the egg tray just below the plane of the bottom 33 are in general similar in construction to said bottom. The egg tray has, therefore, a sectional bottom comprising the major section 33 and minor end sections 51 and 52, each of which provides a primary support for eggs. As shown in Fig. 2 when the bottom section 33 is moved to its rearmost position, its rear end completely overlies the end-gate 52 and its opposite end projects slightly over the forward end-gate 51 so that when said section 33 is moved forwardly its forward end will ride freely over the end-gate 51. Each end-gate has metal wear strips 50 on which the overlapping section slides. It will thus be seen that by oscillating the pinion 41 in opposite directions, the front and rear end portions of the bottom sections 33 will be alternately projected over the full length of the front and rear end-gates 51 and 52. By this action, namely, that of the ends of the bottom section 33 traveling under the eggs disposed in the area above the end-gates 51 and 52, such eggs will be turned. It follows, therefore, that in this embodiment, the egg-turning means which supports the eggs, is located wholly within the tray frame and provides a comparatively flat tray bottom interrupted only by the presence of the narrow baffle plates 34, which obviously do not appreciably lessen the egg-carrying capacity of the tray. When the chicks commence to pip the shells, the attendant will move the bottom section 33 entirely to one end, preferably to the rear and remove the end-gate 51 to allow the chicks to drop through the opening thus afforded, to the nursery tray 26. Thus, in order to provide this hatch opening, it is not necessary to disturb the egg tray 27 or to remove it for removing any part thereof.

In practice, it will be seen that my improved egg-turning means may be used either in a single compartment incubator or in any series of compartments. All the compartments in horizontal alignment may be connected by a single shaft 42, and the egg-turning devices may be operated from one end thereof. In view of the construction of the egg-turning device and the means for operating the same, the matter of oscillating the shaft 42 by means of the hand crank 49 is not difficult, and in fact, the operation of simultaneously turning a large number of eggs may be effected quickly, easily and conveniently. In the construction disclosed, it is only necessary to turn the crank about three-fourths of a turn in one direction to turn the eggs. Two or three turning movements of this kind are all that are necessary each twenty-four hours. It is also desired to reverse the position of each tray every day or two, so that the eggs at the front of the compartment will be positioned at the rear, and so on, upon each reversal of the tray. The object of this is to insure that the eggs throughout the tray will be incubated at the same average temperature. This is not possible if the egg tray is not reversible, for the reason that the eggs near the front of the compartment, that is, close to the door, will be slightly cooler than those at the back, because of radiation through the glass in the door and of the cooler outside temperature. In the present incubator it will be understood that by reason of the central position of the rack 37 and of the means for shifting the pinion into and out of mesh with the rack, the tray will be quickly and easily reversed and the egg-turning device will function just as effectively in either position.

For convenience in construction, the pinion shaft 42 may be made in sections, one section to each egg compartment unit. In the present case, the shaft section 42 carried by the egg compartment unit 12 is detachably connected with the shaft 42' carried by the unit 13. Such detachable connection is shown in Fig. 4 in which the shaft 42 carries a coupling sleeve 53 having a diametrical pin 54 adapted to be received in the slots 55 in the shaft 42'. This permits quick assembly of the units and establishes a secure driving connection between the shaft sections.

It is believed that the foregoing conveys a clear understanding of the objects prefaced above, and while I have illustrated but a single working embodiment, it should be understood that considerable change might be made in the construction and operation without departing from the spirit and scope of the invention as expressed in the appended claims.

I claim:

1. In an incubator, in combination, a frame bounding an egg-carrying area, a nursery below said frame, a foraminous bottom on which the eggs are adapted to be supported and which is mounted to slide back and forth in said frame in egg-turning movements, said bottom being slightly shorter than the frame and, when moved to one end thereof, leaving an opening within and at the opposite end of the frame through which the chicks may drop to the nursery below, and egg baffles in spaced relation above the egg-supporting bottom.

2. In an incubator, in combination, a frame bounding an egg-carrying area, a nursery below said frame, a foraminous egg-supporting bottom adapted to be moved back and forth in said frame in egg-turning movements and covering said area except for a narrow area at one end of the frame when moved to the opposite end thereof, which narrow area affords a hatch opening through which the chicks may drop to the nursery below, egg baffles in spaced relation above the egg-supporting bottom, and means for supporting eggs in said opening so that they may be turned by movement of the bottom.

3. In an incubator, in combination, a frame bounding an egg-carrying area, a nursery below said frame, a foraminous egg-supporting bottom covering substantially the entire egg-carrying area in the frame and adapted to be moved back and forth in egg-turning movements and to leave, when moved to one position, an area affording a narrow hatch opening through which the chicks may drop to the nursery below, egg baffles in spaced relation above said bottom, and means normally supporting eggs in said hatch opening area, which eggs are adapted to be turned by said bottom, said means being movable from said egg-supporting position to uncover the hatch opening.

4. In an incubator, in combination, an egg compartment having a doorway, an egg tray movable into and out of said compartment through said doorway, a nursery below the egg tray, said tray having a foraminous bottom reaching from side to side of the tray and substantially from end to end thereof and adapted to be moved back and forth in the tray in egg-turning movements and leaving, when moved in one direction, an opening across one end of the tray through which the chicks may drop to the nursery below, and egg baffles in the tray, the tray being so positioned in the egg compartment that said opening will be located adjacent to the doorway.

5. In an incubator, in combination, an egg tray having a narrow gate extending across one end and serving normally as a bottom section on which eggs may be supported, a major egg-supporting bottom section adapted to be moved back and forth in the tray and to overlie said gate from end to end when in one position, egg baffles, and a nursery below the egg tray into which the chicks may drop when said major bottom section is withdrawn from said end gate and the latter is opened.

6. In an incubator, in combination, an egg tray having a foraminous bottom including a major and a minor egg-supporting section, egg baffles, the minor section extending across one end of the tray and being movable to provide a hatch opening, and a nursery below the egg tray for chicks which drop through said hatch opening, the major section being movable back and forth in egg-turning movements in which one end portion of the major section moves back and forth over the minor section from end to end thereof so as to move all the eggs on both sections by comparatively short egg-turning movements.

7. In an incubator, the combination of a plurality of egg trays, each of which has a movable bottom section, egg baffles for each tray, a rack on each movable bottom section, a shaft carrying a series of gears, one for each rack, and adapted to be operated for moving the movable bottom sections back and forth.

8. In an incubator, in combination, an egg compartment having a doorway, an egg tray movable into and out of said compartment through said doorway, a nursery below the egg tray, said egg tray having a foraminous bottom covering substantially the entire egg-carrying area of the tray and adapted to be moved back and forth in egg-turning movements and leaving, when moved in one direction, an opening across one end of the tray through which chicks may drop to the nursery below, egg baffles in the tray, and operating means for moving said bottom back and forth including means operable through said doorway for disconnecting the bottom from the operating means.

9. In an incubator, in combination, a plurality of egg compartments each having a doorway, an egg tray in each compartment adapted to be withdrawn therefrom through its doorway, a nursery below each egg tray, each egg tray having a foraminous bottom covering substantially the entire egg-carrying area of the tray and being movable back and forth in egg-turning movements and leaving, when moved in one direction, a hatch opening across one end of the tray, egg baffles for each tray, a shaft, and an optionally engageable connection between the shaft and each bottom for moving the latter back and forth by turning movement of the shaft.

10. In an incubator, in combination, a plurality of egg compartments each having a doorway, an egg tray in each compartment adapted to be withdrawn therefrom through its doorway, a nursery below each egg tray, each egg tray having a foraminous bottom covering substantially the entire egg-carrying area of the tray and being movable back and forth in egg-turning movements and leaving, when moved in one direction, a hatch opening across one end of the tray, egg baffles for each tray, a shaft common to all of the egg compartments, and means operable between each tray bottom and the shaft for moving the bottom back and forth by turning the shaft, including means operable through the doorway for disconnecting any one or more of the bottoms from the shaft.

11. In an incubator, in combination, a plurality of egg compartments, an egg tray in each compartment, a nursery below each tray, each tray having an egg-supporting bottom reaching from side to side and substantially from end to end thereof and being movable back and forth in the tray in egg-turning movements and leaving, when moved in one direction, a hatch opening across the opposite end of the tray, egg baffles for each tray, and means optionally connectible with said movable bottoms for moving them.

12. In an incubator, the combination set forth in claim 11, including an egg-supporting bottom section for each tray adapted to normally cover the hatch opening therein and to underlie the movable bottom so that the latter moves back and forth over it, said bottom section being movable from said normal position to uncover the hatch opening.

13. In an incubator, in combination, an egg tray, a nursery therebelow, the egg tray having a sectional egg-supporting bottom composed of a major and a minor portion, the major portion covering substantially the entire egg-carrying area of the tray and leaving a comparatively narrow egg-carrying area at one end of the tray, the minor bottom portion covering said smaller area, egg baffles, means for moving said major bottom portion back and forth in egg-turning movements, each a distance equal substantially to the width of said narrow area, said major bottom portion moving over said minor bottom portion, and said minor bottom portion being movable from its egg-supporting position to provide a hatch opening through which the chicks may drop to the nursery below.

14. In an incubator, in combination, a frame having sides and ends, a nursery below the frame, a foraminous bottom reaching from side to side and substantially from end to end of the frame and adapted to support eggs throughout substantially the entire area bounded by said frame, said bottom being movable back and forth from end to end of the frame in egg-turning movements, and leaving when moved to one end, a narrow hatch opening reaching across the opposite end and through which chicks may drop to the nursery below, egg baffles above said bottom, the eggs resting at all times on said bottom and being moved rotatably by frictional contact with the bottom and by lateral thrust resisted by said baffles, and means for moving the bottom back and forth in comparatively short movements.

15. In an incubator, in combination, an egg tray, a foraminous egg-supporting bottom slidable back and forth in the tray and adapted when moved in one direction to leave a space affording a hatch opening along its trailing edge, egg baffles, means supplemental to said bottom, adapted to support eggs in said space when the bottom is withdrawn therefrom, and a nursery tray below the egg tray for chicks which drop through said hatch opening, means for sliding said bottom back and forth for turning the eggs supported by the bottom and those supported by said egg-supporting means.

FRANKLIN C. HARE.